(12) United States Patent
LaPointe

(10) Patent No.: US 6,173,929 B1
(45) Date of Patent: Jan. 16, 2001

(54) ONE ARM LIFT

(76) Inventor: Robin LaPointe, 223 Springdale, Pointe Claire, Quebec (CA), H9R 2R4

( * ) Notice: Under 35 U.S.C. 154(b), the term of this patent shall be extended for 0 days.

(21) Appl. No.: 09/257,696

(22) Filed: Feb. 25, 1999

(51) Int. Cl.[7] ................................................. F16M 11/12
(52) U.S. Cl. ..................... 248/183.2; 248/407; 248/170
(58) Field of Search ................................... 248/161, 407, 248/415, 166, 170, 173, 183.1, 183.2, 186.2, 186.1, 525, 125.9

(56) References Cited

U.S. PATENT DOCUMENTS

| | | | | |
|---|---|---|---|---|
| 578,809 | * | 3/1897 | Bronson | 248/457 |
| 2,502,667 | * | 4/1950 | Pagett | 248/161 |
| 2,646,956 | * | 7/1953 | Cadwell et al. | 248/170 |
| 2,956,529 | * | 10/1960 | Samalion | 248/161 |
| 3,173,642 | * | 3/1965 | Greenspan | 248/170 |
| 3,741,509 | * | 6/1973 | Kelly | 248/161 |
| 3,861,695 | * | 1/1975 | Shourek et al. | 280/5.24 |
| 3,885,689 | * | 5/1975 | Grove et al. | 414/462 |
| 3,926,393 | * | 12/1975 | Tainsh | 248/165 |
| 4,520,981 | * | 6/1985 | Harrigan | 248/161 |
| 4,844,393 | * | 7/1989 | Lee | 248/161 |
| 5,090,648 | * | 2/1992 | Wood, IV | 248/161 |
| 5,320,227 | * | 6/1994 | Minoura | 211/22 |
| 5,330,143 | * | 7/1994 | Rich et al. | 248/161 |

* cited by examiner

*Primary Examiner*—Ramon O. Ramirez
*Assistant Examiner*—Jon A Szumny

(57) ABSTRACT

This is a device to assist in the loading of a boat (canoe) onto the top of a vehicle by only one person. This device does not come into contact with any part of the vehicle. In this invention four legs are attached to the bottom lift tube base, thus supporting the lift tubes in the vertical position. The height of the stand is adjustable by placing the height adjust pin into the desired through hole. Once adjusted the rotary shaft is moved to its horizontal position, protruding out towards the side. Separately, the boat plate is firmly fixed to one end of the boat by the use of a strap and buckle. With the use of your hands, you rotate the boat on the ground to its side, then lift the boat until the connect pin falls into the hole on the rotary shaft. Once in, a clip is used to secure the boat plate to the stand. The user then moves to the side of the boat and lifts and rotates it upwards until the lock collar falls into its locking position. The boat is now firmly anchored in the top position. Now the unsupported end can be lifted and rotated over the top of the vehicle by the use of one person. Once on the top of the vehicle, the stand and boat plate can easily be removed and disassembled for easy transport.

2 Claims, 10 Drawing Sheets

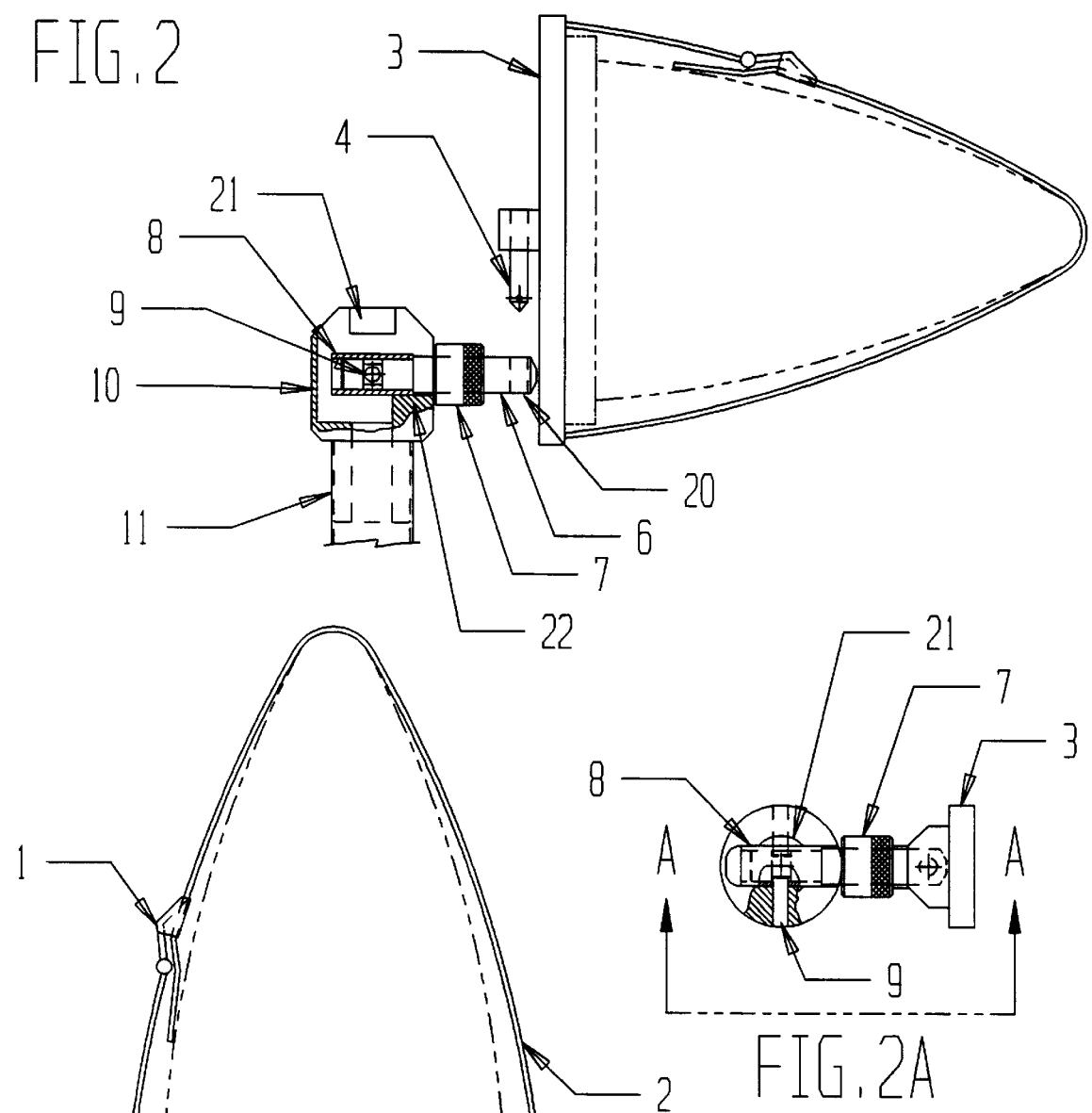
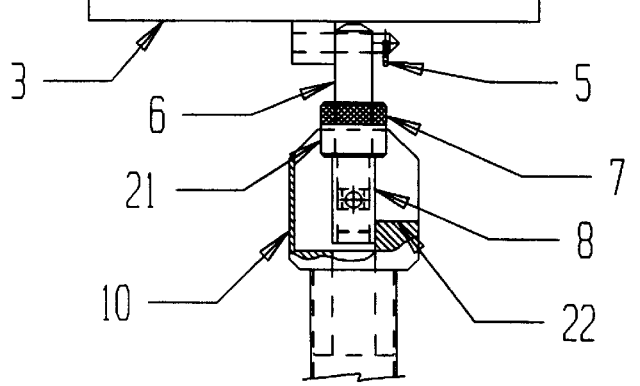

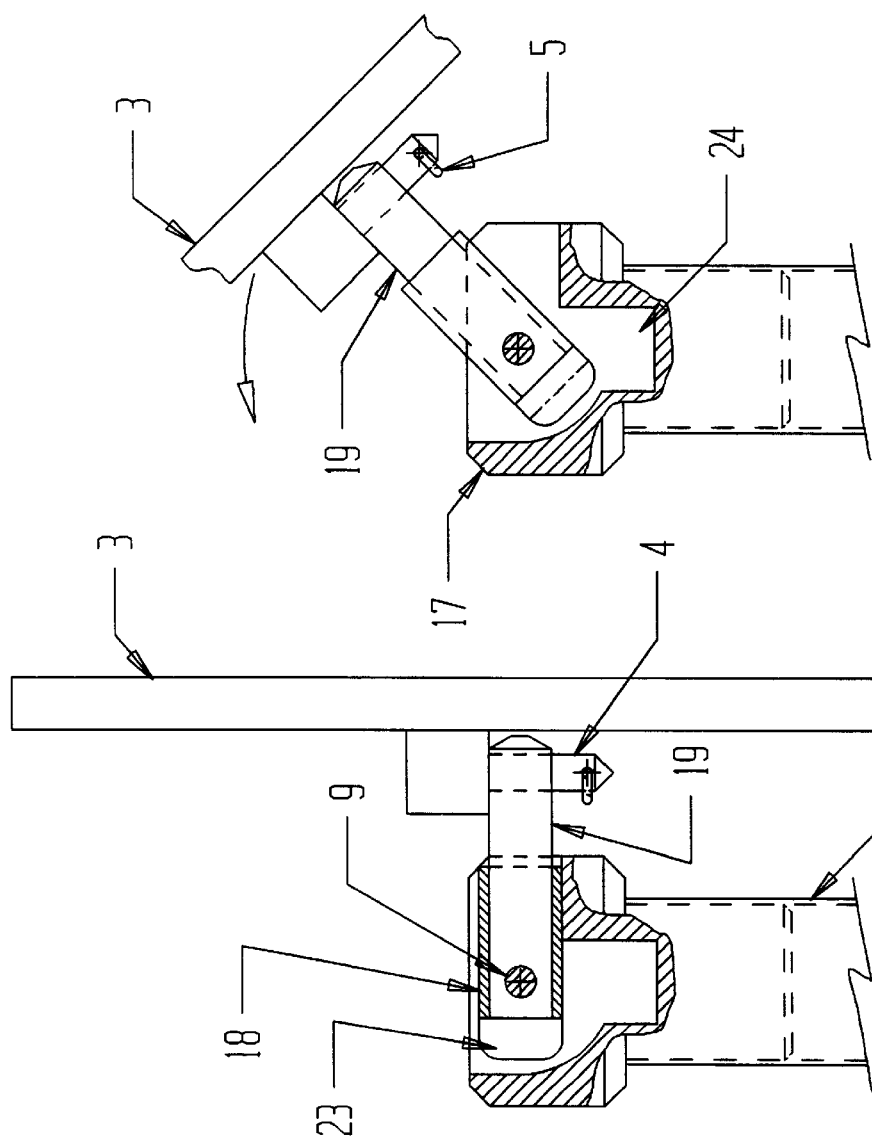

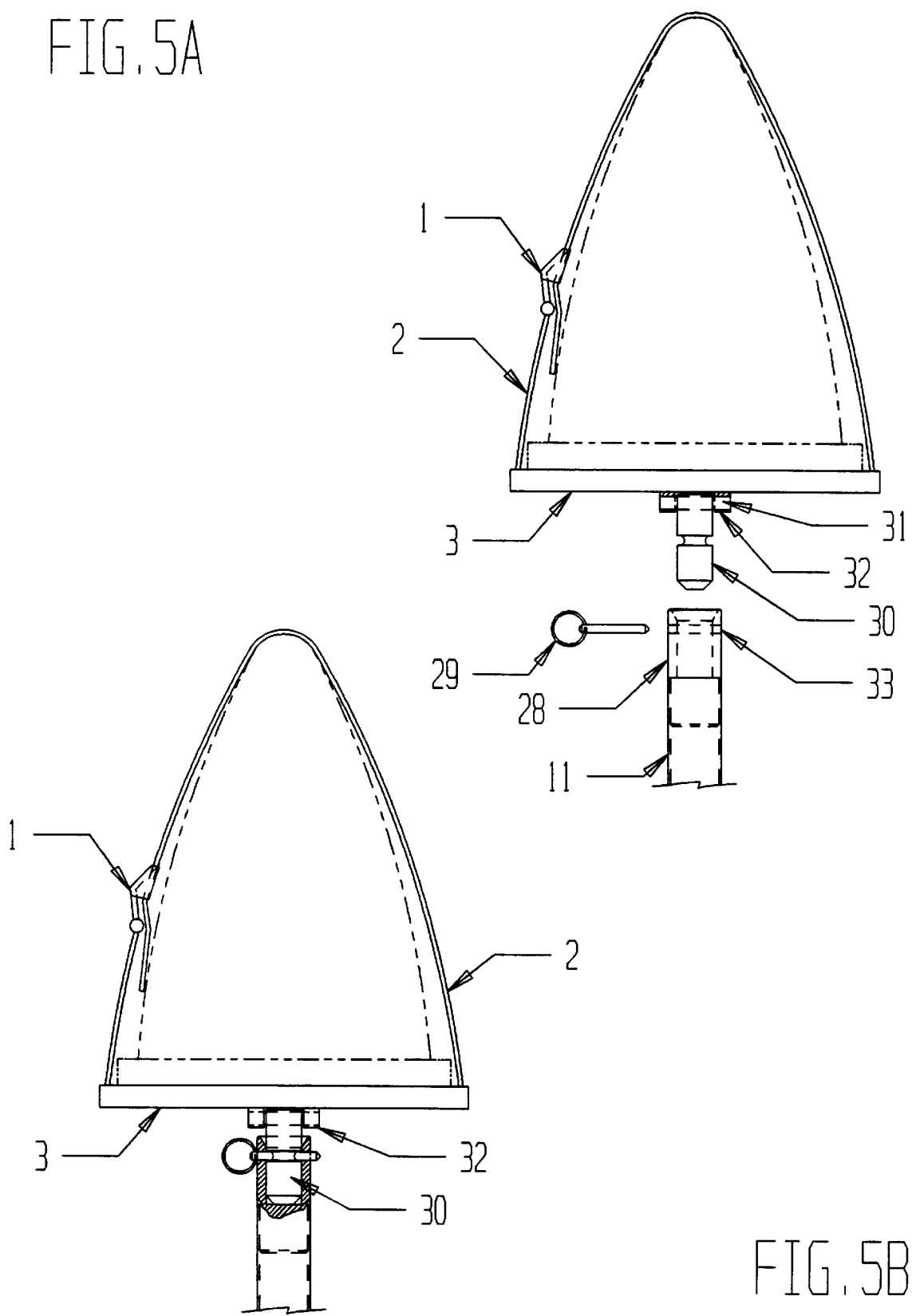

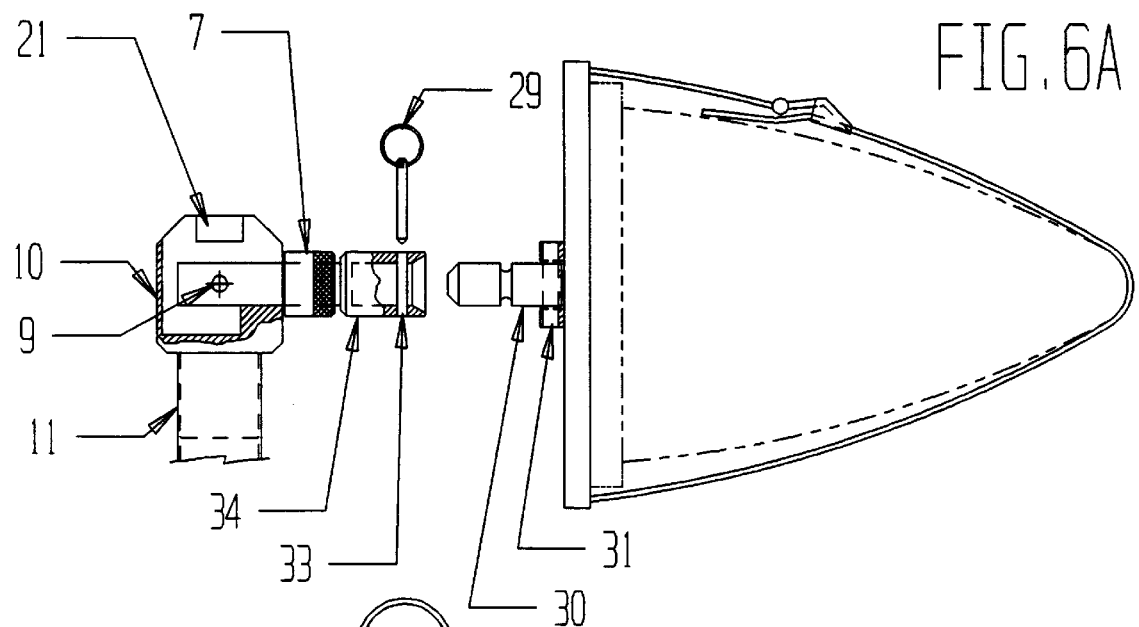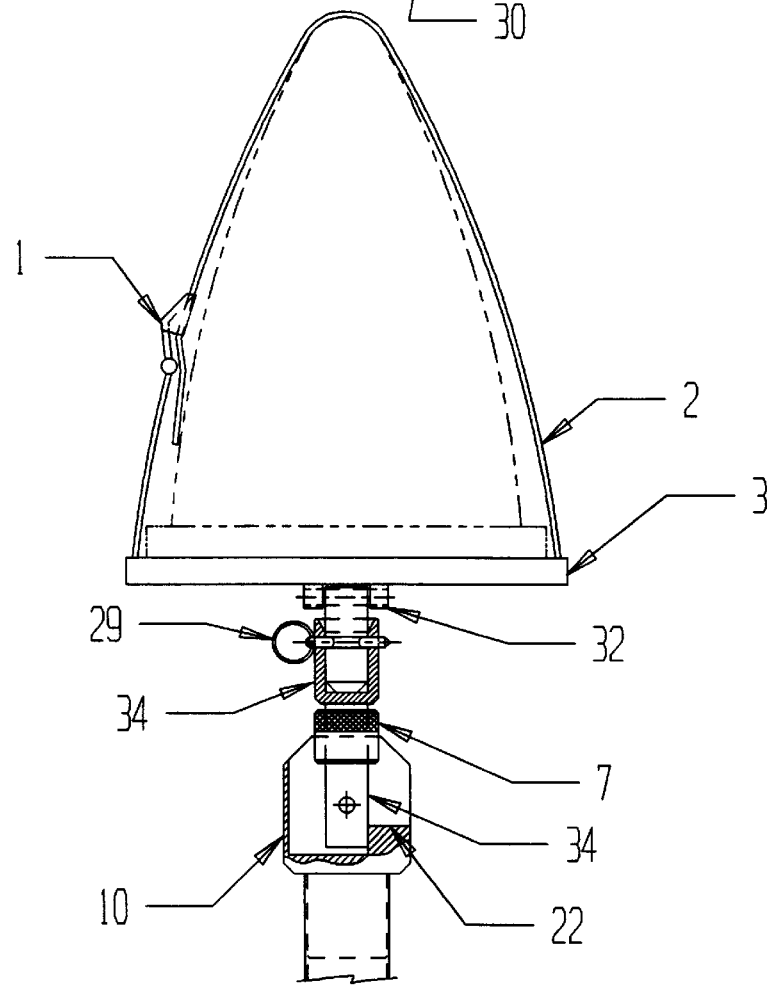

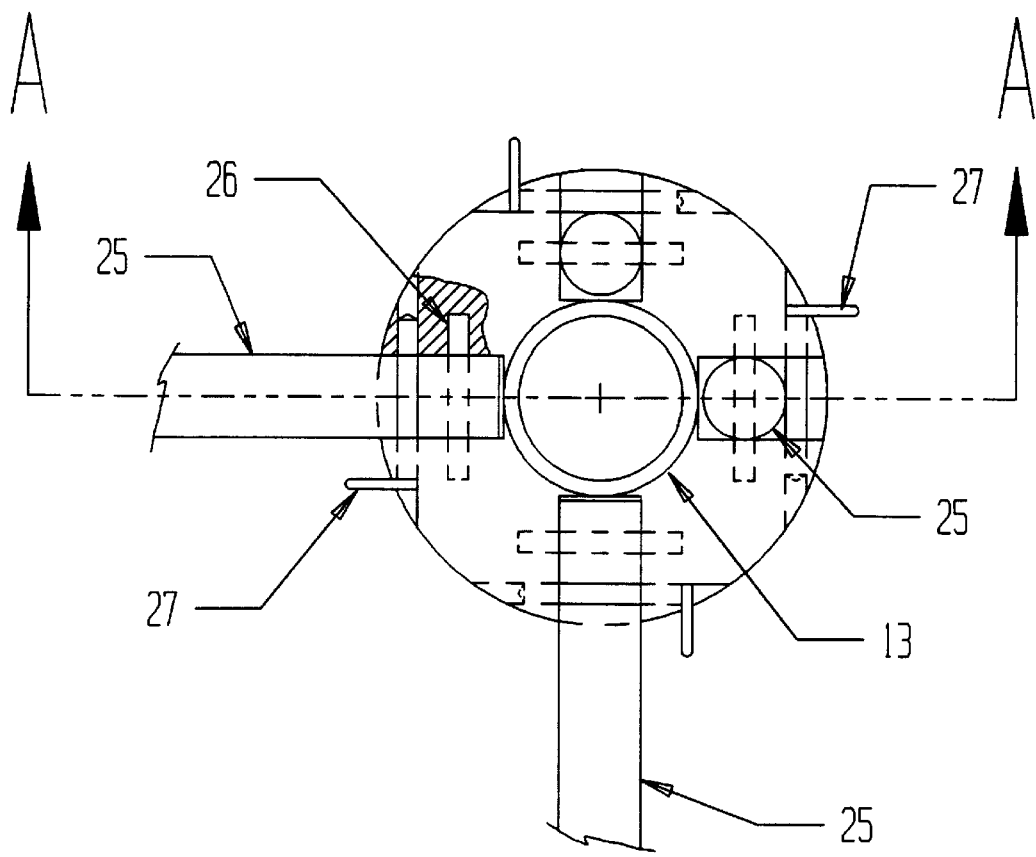
FIG. 7
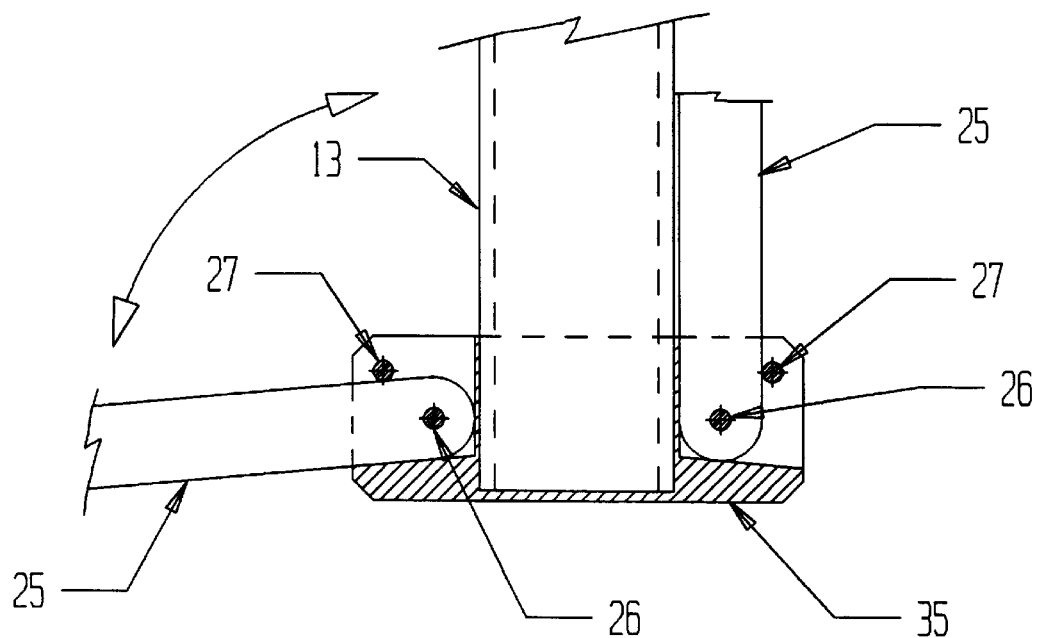

ONE ARM LIFT

BACKGROUND OF THE INVENTION

This invention is a portable, folding boatlift stand in which allows you to attach a boat easily to it, and to use it as a second person. This invention eliminates the need for a second person to load or to remove from the roof of a vehicle a boat while reducing any possible damage to the vehicle.

People over the years have thought up different ways or tricks to load a boat onto the top of a vehicle all by themselves. Some have placed boards or makeshift supports off of their roof racks to support a boat. Others have bought expensive roof racks and attachments. All these methods require your vehicle having a roof rack, and the need of lifting the boat onto these supports. Once supported, you must slide and shuffle the boat over this support on to the vehicle. With doing so, you risk damaging the boat and vehicle, and increase the possibility of the boat falling down. This method can only be done if you can lift the canoe up in the first place. To do a good safe job you should have two people to do it. Even loading to a high level, such as a van, is dangerous with two people because of the tendency for the canoe to roll over in this upside down position.

Today it is common for a canoeist going alone to ask for help when placing or removing their canoe. The problem is that many times you want to be alone and there is no one around to help and/or they may not have the time when you would like them to help.

BRIEF SUMMARY OF TRE INVENTION

Accordingly, the above problems and difficulties are obviated by the present invention which provides a easy, one person method of loading a small boat onto a vehicle. This is a novel boat loading, lifting device. This device adjusts for most vehicle types and small boats. It's self-standing and does not come into contact with the vehicle. No roof rack, make shift device, or attachment is required to use this one arm lift. Its height can be adjusted for different vehicles, and it assembles/dissembles for easy transport and storage. This invention replaces a second person, allowing only one person to load a boat on to a vehicle, by himself or herself.

Therefore, it is among the primary objects of the present invention to provide a lifting, pivoting support to support one end of a small boat while loading the other end.

Another object of the present invention is to provide a novel folding leg assembly. Instead of the support legs being removable, they would fold up and down and lock in your desired position.

Yet another object of the present invention is to provide a novel fixed top guide and a movable pivot shaft. This allows a boat to be loaded from above the top of the lift.

Still a further object of the present invention is to pivot the top guide to the side, then slide and lock in the pivot shaft.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 2 shows how the canoe is attached to the one arm lift. It also shows the side view of the lift components.

FIG. 2A shows the top view of the lift head in the canoe mounting position.

FIG. 3 shows the canoe rotated in the up wards position along with all of its components.

FIGS. 4A,B,C. shows a possible variation of the lift head and how it works.

FIGS. 5A, B shows another variation of the lift head with its post in a fixed up position.

FIGS. 6A,B shows a different variation of the views of the lift head shown in FIG. 5.

FIG. 7 shows a different bottom tube configuration incorporating folding legs that can fold up for storage, and down for use.

DETAILED DESCRIPTION OF THE INVENTION

Figure 1:
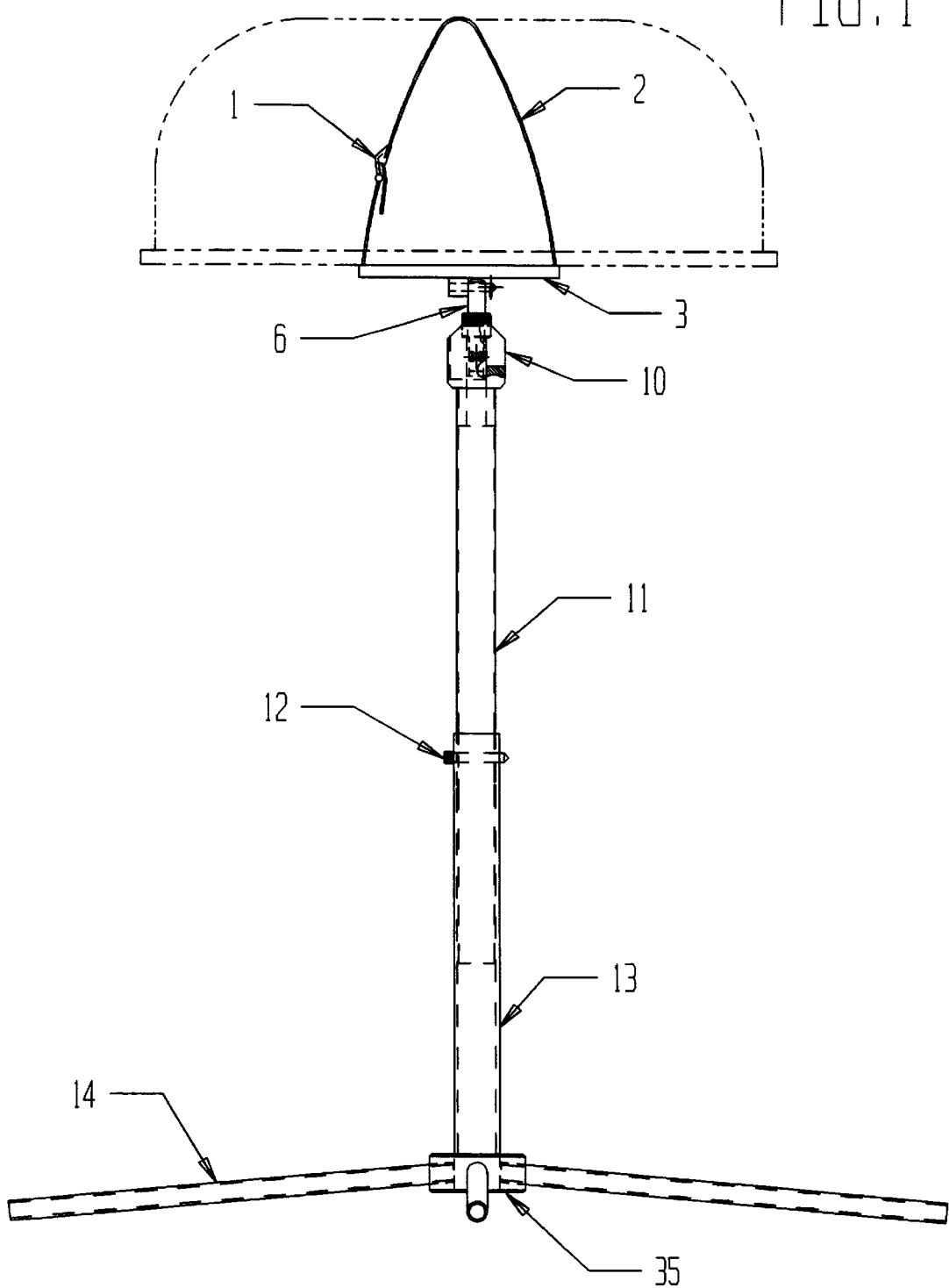
FIG. 1 is a general side view of the invention.

FIG. 1 shows the complete side view of the one arm lift. It is made up of four tubular legs 14 protruding from the center axis of the bottom lift tube 13, equally spaced, projecting downwards on a slight angle. This slope downwards angle gives the legs better ground friction and also helps in compensating for uneven ground conditions. These legs 14 slide into the tube base 35 by hand for easy assembly.

The bottom lift tube 13 is rigidly attached to the tube base 35 and extends vertically upwards. Inside the bottom lift tube 13, the top lift tube 11 can slide freely. The height adjust pin 12 is used to adjust the top lift tube 11 vertically for different vertical heights. There are several holes in the top lift tube 11 for different height selections. Simply align up the holes in the bottom lift tube 13 with tube 11 and press the height adjust pin 12 through. This locks the two lift tubes 11 & 13 together creating a rigid assembly.

The lift head 10 is fixed to the top of the lift tube 11. The rotary shaft 6 is shown in the vertical position with the boat plate 3 attached to it. The canoe is shown as reference only. Any light boat can be used.

FIG. 2 shows the top position of the one arm lift. It shows how the boat plate 3 attaches to the rotary shaft 6. On the ground the boat plate 3, along with the strap 2 are fixed by the buckle 1 to one end of the canoe firmly. The rotary shaft 6 and lock collar 7 are rotated horizontally as shown. The hole 20 in the rotary shaft 6 is then rotated to a vertical position. By using your hands, you then roll the canoe onto its side at the end where the boat plate 3 is fastened. You then lift the canoe maintaining the side orientation and aligning the connect pin 4 over the hole 20, then drop it through. Once through, release the canoe and place the clip 5 into the hole in the connect pin 4.

The rotary shaft 6 is free to rotate 360 degrees inside of the pivot tube 8. The two pivot pins 9 located on both sides of the lift head 10 are fixed, and extend through the pivot tube 8 and in to the cavity of the rotary shaft 6. There is a clearance between the pivot pins 9 and the tube 8, thus allowing the pivot tube 8 to rotate around the center axis of the pivot pins 9. The rotary shaft 6, with clearance is free to rotate inside of the pivot tube 8. With the pivot pins 9 extending into the cavity of the rotary shaft 6, it in turn prevents the rotary shaft 6 from pulling out. There is a shoulder on the rotary shaft 6 to prevent any movement along its length towards the center of the lift head 10.

The lock collar 7 has a minimum clearance hole through its center to allow it to slide freely over the rotary shaft 6.

FIG. 2 as shown has the pivot tube 8 resting, supporting the weight of the canoe on the shoulder 22. Shoulder 22 acts as a positive stop.

FIG. 2A shows a top view of FIG. 2, indicating the orientation of the two pivot pins 9 within the rotary shaft 6 cavity.

FIG. 3 shows the orientation of the lift head 10 once rotated 90 degrees. Once the boat plate 3 is fastened onto the rotary shaft 6 by the clip 5, the operator then moves to the outside of the canoe and rotates it upwards.

The rotary shaft 6 will pivot around the center axis of the pivot pins 9. The lock collar 7 will follow the outside contour of the lift head 10 while sliding on the rotary shaft 6. Once the rotary shaft 6 is in the vertical position, the lock collar 7 will fall downwards due to gravity into a bored recess 21 on the centerline of the lift head 10. When it falls down, it then prevents the rotary shaft 6 from moving in any direction. Also when the rotary shaft 6 is in the vertical position, the pivot tube 8 contacts the vertical shoulder 22, thus acting as a stop.

With the one arm lift in this position, the weight of the canoe is passed through the boat plate 3, through the connect pin 4 and down the centerline of the rotary shaft 6. The rotary shaft 6 shoulder presses on to the top of the pivot tube 8 in which in turn loads the two pivot pins 9. In this state the rotary shaft 6 can freely rotate along its center axis. Also, the boat plate 3 can rotate only along the connector pins axis. All this mean is that the end of the canoe can be lifted upwards and rotated around the center axis of the rotary shaft 6. This set up prevents the canoe from rolling from side to side. The boat plate 3 and the canoe centerline are in line with each other as shown. This centerline is slightly offset to the centerline of the rotary shaft 6. By being so, the canoe weight is slightly maintaining a side load on the pivot tube 8 onto the shoulder 22.

If desired, the boat plate 3 could be rotated back to its vertical position by simply lifting upwards the lock collar 7 until it clears the recess 21. Then rotate the rotary shaft 6 over the center axis of the pivot pins 9 until the side of the pivot tube 8 comes in to contact with the horizontal shoulder 22.

FIGS. 4A, B, and C, show another method of locking the rotary shaft into position. This system uses the same logic of FIG. 3 but the rotary shaft 19 has a shoulder on the bottom end of the shaft to prevent it from sliding out of the pivot tube 18. The pivot pins 9 support the pivot tube 18 as in FIG. 3, but do not extend in to the rotary shaft 19. By doing so, there is no lock collar 7.

When the canoe is rotated upwards, the rotary shaft 19, captured between its shoulder and the lift head 17, falls downwards following the profile of the lift head 17. Gravity is always pushing the rotary shaft head 23 downwards until it aligns over the lift head cavity 24. The rotary shaft 19 then falls downward in to the bottom of the lift head cavity 24. In this position no side movement of the rotary shaft 19 can happen. Only rotation along the rotary shaft 19 center axis is possible.

To reverse this set up, simply lift up on the rotary shaft 19 and its head 23 will exit the lift head cavity 24. Then the rotary shaft 19 is free to rotate along the center axis of the pivot pins 9 to its horizontal position.

FIG. 5A shows the lift tube 11 with a different mounting arrangement. The top guide 28 is fixed to the top lift tube 11. The strap 2 attaches the boat plate 3 to the top end of the boat. Pins 31 attach the pivot shaft 30 to the pivot blocks 32. These pins 31 allow the pivot shaft 30 to pivot freely in one direction around its center axis. Pivot blocks 32 are fixed to the boat plate 3. The top guide 28 has a taper to allow easy alignment of the pivot shaft 30 to enter it. Once in, the lock pin 29 is inserted into hole 33. This lock pin 33 prevents the pivot shaft 30 to be removed from the top guide 28. The groove on the pivot shaft 30 has two functions; one is to allow itself to rotate around the center axis of the top guide 28 and also to entrap the lock pin 29.

This arrangement allows the boat plate 3 to rotate in only two directions. It can rotate around the center axis of the pivot shaft 30 and can pivot perpendicularly to the pin 31.

FIG. 5B shows the assembly of the pivot shaft 30 engaged with the top guide 28. The lock pin 29 is in its lock position preventing the pivot shaft 30 from being removed.

FIG. 6A shows a combination of FIGS. 2 and 5. The principle of attaching the boat plate 3 to the pivot guide 34 is the same as in FIG. 5A. The pivot shaft 30 gets inserted into the pivot guide 34 and locked with the lock pin 29. Once locked, the pivot shaft 30 can not be removed, although it is still free to rotate along its center axis. Once attached to the One Arm Lift, the boat can be rotated upwards around the center axis of the pivot pin 35. The lock collar 7 will follow the outside contour of the lift head 10 while sliding on the pivot guide 34. Once the pivot guide 34 is in the vertical position, the lock collar 7 will fall downwards due to gravity into a bored recess 21 on the centerline of the lift head 10. When it falls down, it then prevents the pivot guide 34 from moving in any direction. Also when the pivot guide 34 is in the vertical position, it contacts the vertical shoulder 22, thus acting as a stop.

FIG. 6B shows the pivot shaft 30 in the vertical position with the collar 7 in the locked position. In this position, the boat plate 3 is allowed to rotate freely around the center axis of the pivot shaft 30, and rotate around the center axis of the pins 31.

FIG. 7 shows another possible style of the leg mounting system. Here we have the bottom lift tube 13 along with its tube base 35. There are four equally spaced legs 25 extending outwards from the centerline of the bottom lift tube 13. These legs 25 pivot around a fixed leg pin 26. In the down position, the leg lock pin 27 is used to lock the leg 25 in the down position. This leg lock pin 27 is also used to lock the leg 25 in the folded up wards position for storage. This would be typical for all four legs 25.

These drawings show a canoe being loaded onto a van, or any vehicle by one person and the one arm lift.

Figure 8:
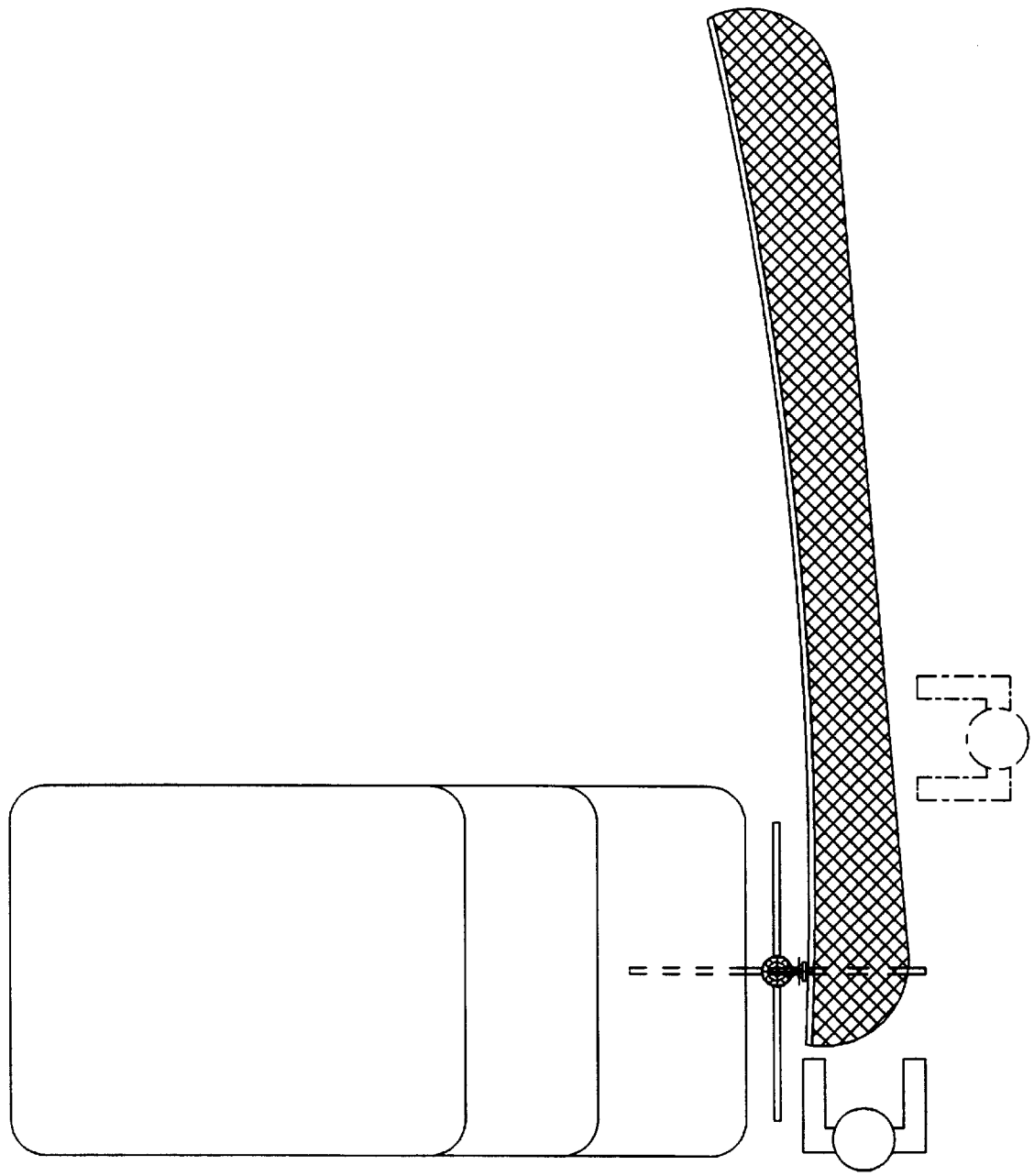
FIG. 8 shows a top view of a typical mounting position of a canoe on top of the one arm lift along with a van and person location.

FIG. 8 shows a canoe mounted on its side to the one arm lift. (see FIG. 2 for mounting explanations). The legs of the lift are placed as shown in line with the canoe, and the canoe at 90 degrees to the vehicle center line. Once the canoe has been attached to the one arm lift, the operator moves to the outside side of the canoe and rotates it upwards.

Figure 9:
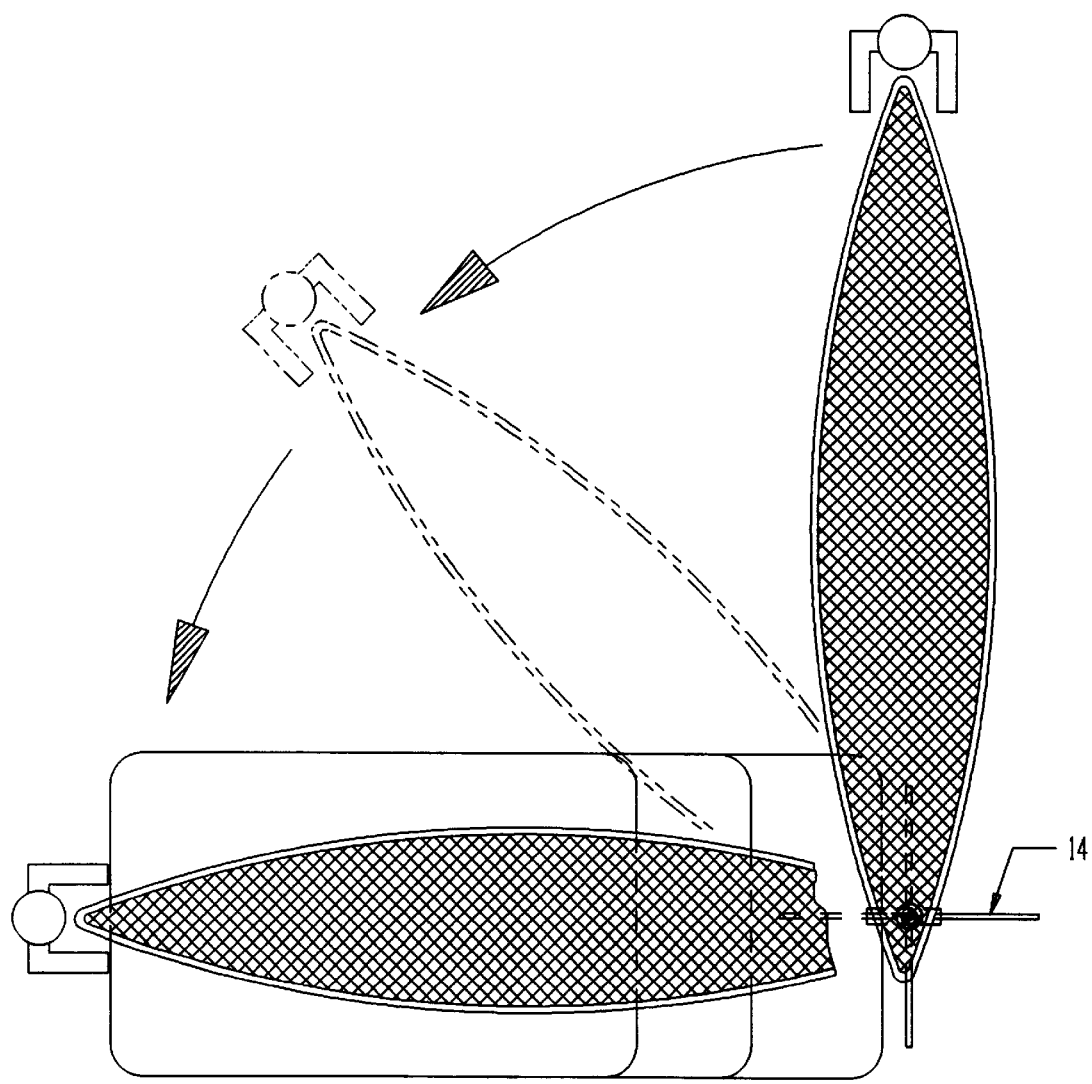
FIG. 9 shows the sequence of a person after rotating the canoe to its upside down position, pivoting the canoe around a radius towards the end of the van.

FIG. 9 shows the operator at the far end of the canoe. He lifts it up wards to a height that would allow the canoe to clear the roof of the vehicle. The operator then carries the end of the canoe sideways around its natural radius towards the end of the vehicle. Once over the top center of the vehicle, the operator then lowers it onto the roof or roof rack.

Figure 10:
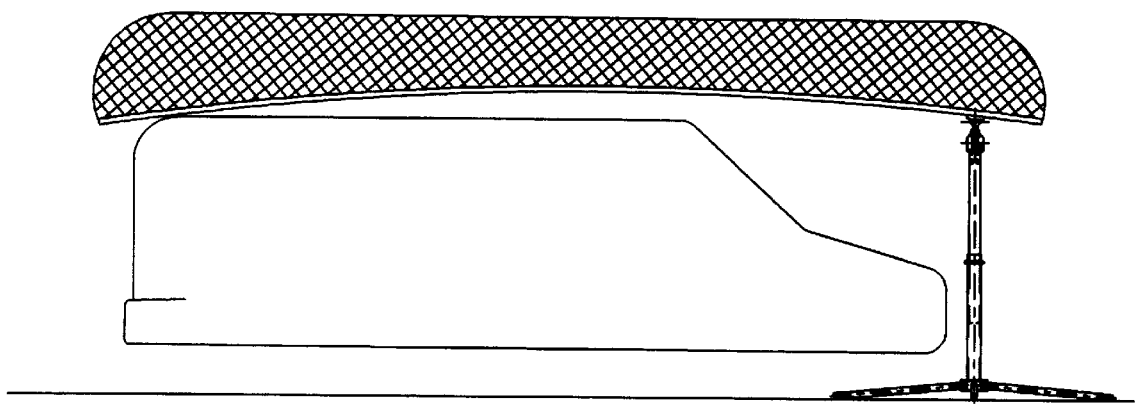
FIG. 10 shows a side view of the canoe attached to the one arm lift, being supported over the van.

FIG. 10 shows the canoe clearing the top of the vehicle with the one arm lift in the front and the operator at the back.

(please note that the one arm lift could be mounted at the back of the vehicle in reverse). Once the weight of the canoe is being supported by the vehicle, the operator can then move to the front where the one arm lift is. By unbuckling buckle 1 and its strap 2, the boat plate 3 will detach from the canoe. Then retract the top lift tube 11 into the bottom lift tube 13. Then remove the legs 14 and place them in to their four carrier holes.

Figure 11:
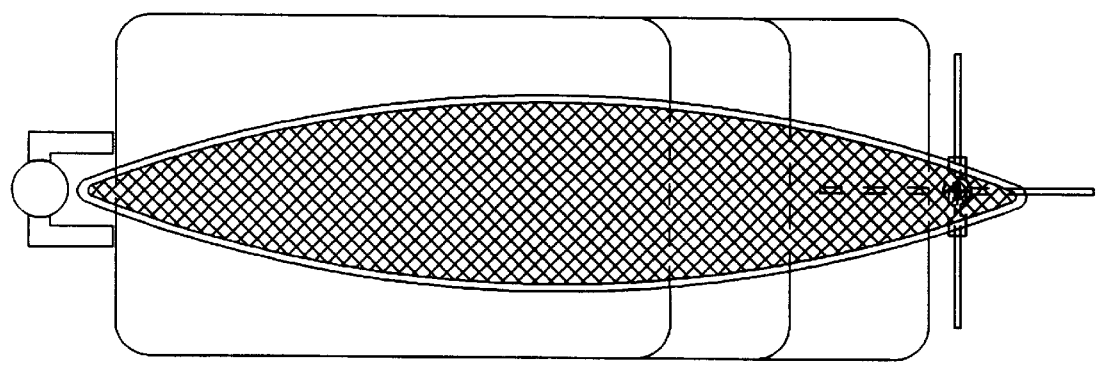
FIG. 11 shows a top view of FIG. 10 with the person holding the end of the canoe.

FIG. 11 shows the top view of FIG. 10.

Figure 12:
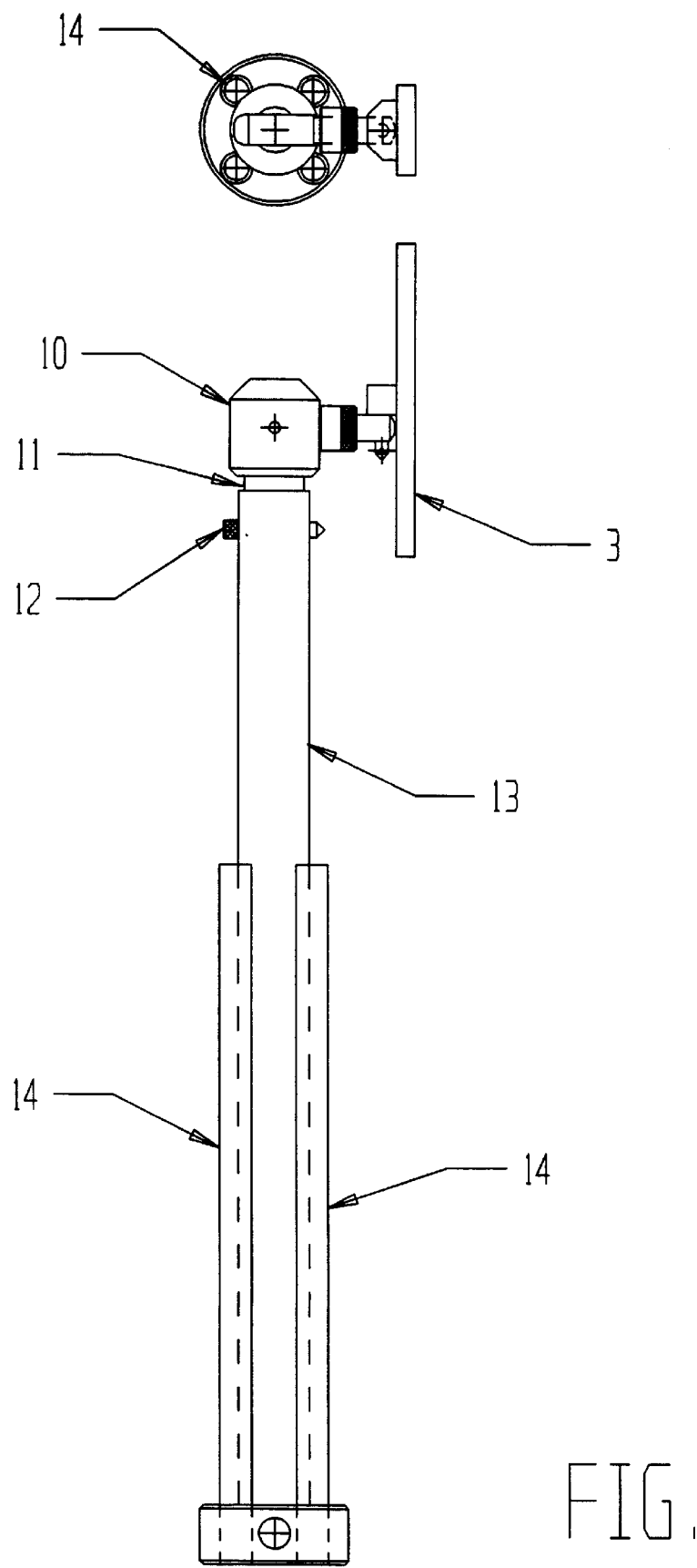
FIG. 12 shows the one arm lift in its collapse position with its four legs in its storage position.

FIG. 12 shows the folded one arm lift assembly. The top lift tube 11 is fully retracted into the bottom lift tube 13. The height adjust pin 12 holds the two lift tubes 13, & 11 together. The four legs 14 are pressed into the carrier holes in which are incorporated in the tube base. The boat plate 3 with its clip 5 are kept in its vertical position.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A portable stand for loading a small boat onto or removing a small boat from the roof of a vehicle, the portable stand comprising:
   a) a base having four cavities equally spaced therearound;
   b) a respective tubular leg pivotally received in each of said four cavities and extending outward from said base at a downward angle;
   c) a bottom lift tube rigidly connected to said base and extending vertically upwards therefrom; said bottom lift tube having adjustability holes;
   d) a top lift tube telescopically connected to said bottom lift tube and having corresponding adjustability holes;
   e) a height adjustment pin engaging said adjustability holes and allowing for height adjustment of said top lift tube;
   f) a lift head fixed to the top of said top lift tube; said lift head having a bored recess therein;
   g) holding means connecting a pivot tube to said lift head, said pivot tube having horizontal and vertical positions;
   h) a rotary shaft received in said pivot tube; wherein said rotary shaft includes a hole therethrough, and is rotatable about its axis and held captive along its length by said holding means;
   i) a connect pin adapted to be received in said hole;
   j) attachment means to attach said connect pin to said boat, said attachment means comprising:
      a strap adapted to partially encircle said boat;
      a buckle adapted to fix said strap to said boat;
      a boat plate fixed to said connect pin that is adapted to be fixed to an end of said boat by said strap;
   k) a lock collar having a clearance hole through its center that is freely slideable over said rotary shaft;
   l) a shoulder connected to said lift head and acting as a positive stop in said horizontal and vertical positions for said pivot tube;
      whereby said lock collar is adapted to follow the outside contour of said lift head and fall downwards into said bored recess when said pivot tube moves from said horizontal position to said vertical position.

2. The portable stand of claim 1, wherein said holding means comprises pivot pins.

* * * * *